No. 676,171. Patented June 11, 1901.
G. P. AASE.
WINDOW.
(Application filed Nov. 5, 1900.)
(No Model.)

Witnesses:
F. D. McMahon.
E. Hoffman.

Inventor,
Georg Prahl Aase
by B. Singer
Att'y.

UNITED STATES PATENT OFFICE.

GEORG PRAHL AASE, OF BERGEN, NORWAY.

WINDOW.

SPECIFICATION forming part of Letters Patent No. 676,171, dated June 11, 1901.

Application filed November 5, 1900. Serial No. 35,507. (No model.)

*To all whom it may concern:*

Be it known that I, GEORG PRAHL AASE, a subject of the King of Sweden and Norway, residing at the town of Bergen, Norway, have invented new and useful Improvements in Windows, of which the following, taken in connection with the accompanying drawings, is a specification.

My invention relates to improvements in windows; and it consists in the arrangement that the window-frames, by means of central pivots, are mounted between a pair of arms and provided with a projecting piece fitting into recesses in the casing and in the post, so as to allow the window to be closed with either side turned inward.

Figure 1:
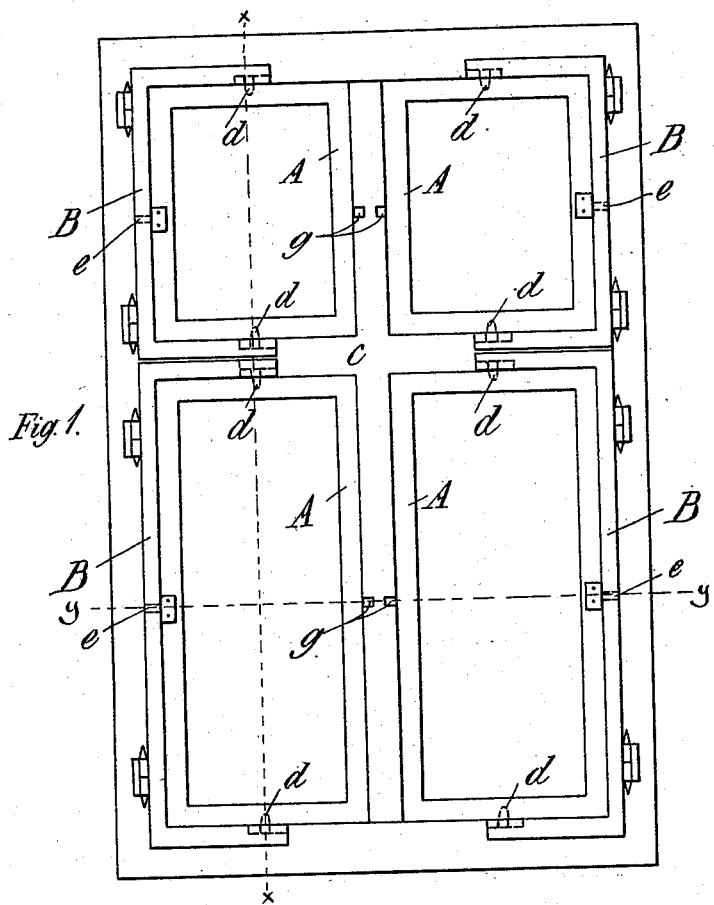
Figure 2:
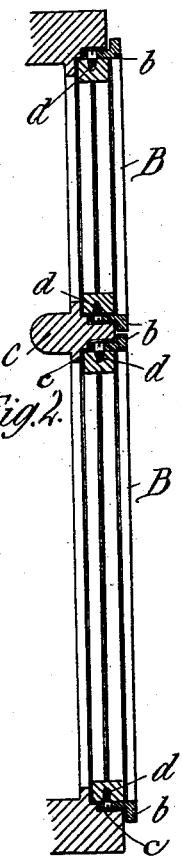
Figure 3:
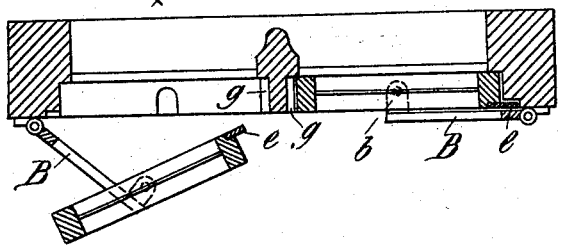
Figure 4:
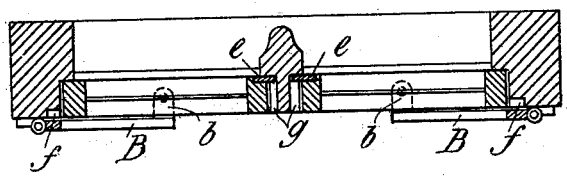

In the accompanying drawings, Figure 1 is an elevation of a window. Fig. 2 is a section on the line $x$ $x$ in Fig. 1. Fig. 3 is a cross-section on the line $y$ $y$ in Fig. 1, showing the left-hand frame partially turned and ready to be closed, with the other side turning inwardly. Fig. 4 is a cross-section on the same line, showing both frames closed, with the outside turned inward.

The window-frames A are each mounted in a frame B, which by means of hinges are secured to the casing. The frames B have on their free ends flanges or lugs $b$, which in the closed position of the window fit into recesses $c$ in the casing and in the cross-piece C. The said lugs $b$ are provided with an aperture to receive a pivot $d$, fastened to the upper and lower sides of the frames A, and by this means the frames are allowed to turn freely in the frames B, so as to be able to close the frames A with either side turned inward, as desired. In order to retain the frames A in position when closed normally, the said frames are provided with a lug or projection $e$, fastened to the side of the frames next to the frame B, and the lug $e$ is arranged to fall into a recess $f$ in the casing, so that it will become locked by the frame B, (see Fig. 3,) covering said recess. The post is also provided with recesses $g$ $g$, so as to allow the frames A to be closed the other way about.

Owing to the fact that the window-frames are mounted pivotally in frames B, which have a vertical portion and two horizontal portions located at the ends of the vertical portions, thus substantially extending around the edges of about one-half of the window, there is an absolute surety of the pivotal connection between the window and frame B being held or retained against spreading, of which there is a tendency when the frame B is swung on its pivot, as the weight of the window, when in a position as shown at the left in Fig. 2, would be entirely on the lower horizontal arm. This weight, however, in the construction herein shown is borne by the hinges of the frame B, and as the frame is an integral one any movement or a tendency of movement of the lower horizontal arm on account of the weight would cause the upper arm to have a corresponding movement, thus retaining the relative positions at the pivot-point. Furthermore, by the form of frame B shown there is no liability of an injury to the window-sash itself in moving the sash to the position shown in Fig. 3. Were the horizontal arms mounted independently on the window-frame and having a pivotal movement should either of the arms bind against the window-frame and pressure be applied to the sash to move it outward, there would be great liability of the sash being sprung or otherwise damaged. As, however, the frame B is pivotally connected with the window-frame with the pivotal connection on the vertical portion and the horizontal arms are formed integral therewith, both arms must move in unison, thereby preventing such springing of the sash.

The frames A might be locked by any ordinary means. (Not shown.)

By this construction of windows the great advantage is obtained that cleaning and polishing can be done all from the inside, whereby the danger connected with the doing of such work from the outside is wholly avoided.

Having now particularly described and ascertained the nature of my said invention and in what manner the same is to be performed, I declare that what I claim is—

The combination with a window-casing and a sash therefor, of a ⊏-shaped frame pivotally connected to said casing at one side of the sash-opening, pins projecting inwardly from the free end portions of the frame, said pins forming central pivot-points for the sash, whereby the sash may have a free pivotal movement on its pivot-points, the latter maintaining a fixed relative position toward the sash; and a lug or projection mounted on the side of said sash and adapted to enter either one of two recesses provided on opposite sides of the frame adjacent to the sash-opening.

In witness whereof I have hereunto set my hand in presence of two witnesses.

GEORG PRAHL AASE.

Witnesses:
S. K. DAHL,
A. LOHMAN.